US008183454B2

(12) United States Patent
Luedecke et al.

(10) Patent No.: US 8,183,454 B2
(45) Date of Patent: May 22, 2012

(54) METHOD AND SYSTEM FOR DISPLAYING COMPONENTS OF MUSIC INSTRUCTION FILES

(75) Inventors: Oliver Helmut Luedecke, Hamburg (DE); Gunter Udo Mensch, Wedel (DE); Stefan Pillhofer, Hamburg (DE)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 12/347,463

(22) Filed: Dec. 31, 2008

(65) Prior Publication Data

US 2010/0162880 A1    Jul. 1, 2010

(51) Int. Cl.
*G10H 1/36* (2006.01)

(52) U.S. Cl. ............... 84/645; 84/602; 84/634

(58) Field of Classification Search ............ 84/645
See application file for complete search history.

(56) References Cited

U.S. PATENT DOCUMENTS

| | | | | |
|---|---|---|---|---|
| 5,931,680 A * | 8/1999 | Semba | | 434/307 A |
| 5,947,746 A * | 9/1999 | Tsai | | 434/307 A |
| 7,179,982 B2 * | 2/2007 | Goto | | 84/616 |
| 7,288,712 B2 * | 10/2007 | Uehara | | 84/645 |
| 2002/0046638 A1 * | 4/2002 | Wright et al. | | 84/477 R |

* cited by examiner

*Primary Examiner* — Anh Mai
*Assistant Examiner* — Christopher Uhlir
(74) *Attorney, Agent, or Firm* — Blakely, Sokoloff, Taylor & Zafman LLP

(57) ABSTRACT

A graphical view of a file component associated with an audio that is displayed in a graphical user interface (GUI) is automatically switched during playback of the audio. The switching is based on a Musical Instrument Digital Interface (MIDI) view-switching track associated with a project file for the audio. In various embodiments, a musical instrument displayed in the GUI is automatically switched during playback of the audio based on a MIDI instrument-switching track associated with the same project file. Additionally, a metronome beat associated with the audio is automatically switched between on and off during playback of the audio based at least in part on a MIDI metronome-switching track associated with the song audio.

17 Claims, 4 Drawing Sheets

METHOD AND SYSTEM FOR DISPLAYING COMPONENTS OF MUSIC INSTRUCTION FILES

FIELD

Embodiments described herein relate to graphical user interfaces (GUIs) for providing musical instruction and more particularly to file structures associated with music-related software.

BACKGROUND

In-person music instruction can be expensive and/or inconvenient because of travel and/or scheduling. Additionally, with group instruction, it can be frustrating to follow a group pace for instruction that may be too fast or too slow for a particular person's skills and abilities. Thus, students, musicians and other music hobbyists are increasingly using computers to improve, expand and strengthen their skills playing a variety of musical instruments. Various conventional computer programs exist to provide musical instruction.

One drawback of conventional music instruction programs is that the displays and/or user interfaces associated with these programs are not intuitive and/or they fail to recreate the visual cues and subtleties that can be critical for learning to play a musical instrument. Another drawback of conventional music instruction programs is that while a user may be able to go through various lessons at his/her own pace, the actual tempo of the music instruction frequently fails to provide adequate flexibility (e.g., accompaniment music may be too fast or too slow or cannot be changed dynamically on the fly). In other words, while these programs may provide convenience and/or cost savings, they ultimately fail to provide the same caliber of instruction that a real person can provide.

SUMMARY OF THE DESCRIPTION

A graphical view of a file component associated with an audio that is displayed in a graphical user interface (GUI) is automatically switched during playback of the audio. The switching is based on a Musical Instrument Digital Interface (MIDI) view-switching track associated with a project file for the audio. In various embodiments, a musical instrument displayed in the GUI is automatically switched during playback of the audio based on a MIDI instrument-switching track associated with the same project file. Additionally, a metronome beat associated with the audio is automatically switched between on and off during playback of the audio based at least in part on a MIDI metronome-switching track associated with the song audio.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems provide improved graphical user interfaces for providing musical instruction. The methods, apparatuses, and systems described herein can be used in conjunction with music/audio software such as, for example, Garage Band™ offered by Apple, Inc. of Cupertino, Calif. In various embodiments, an interface is provided which displays song instruction videos, musical scores, instrument animations with fingering displays, and/or a control panel to control various components of the system. It will be understood in embodiments described herein that a song refers to any musical composition. Thus, a song file refers to a file associated with a musical composition and a song audio refers to the audio associated with the musical composition.

Figure 1:
FIG. 1 is a block diagram illustrating a system according to various embodiments.

FIG. 1 is a block diagram illustrating a graphical user interface (GUI) display in a music instruction system according to various embodiments. For a given song (to be taught/learned), GUI 112 provides a variety of displays to facilitate the musical instruction. Video/movie display 114 displays a video of the song. In various embodiments, the video sets the foundation component to the song instruction. The video itself may be maintained in a single video file (e.g., a Quicktime® file). In certain embodiments, audio associated with the video is maintained in a separate audio file. The video includes one or more angles/views of an instructor playing the song on an instrument (e.g., guitar, piano, etc.). The video angle(s)/view(s) may change during playback of the song video. In some embodiments, each video angle is maintained in a separate video file.

In embodiments where the video includes multiple views, one view might be, for example, of the right hand playing the instrument (e.g., piano, guitar, etc.) while another view shown simultaneously might be of the left hand playing the instrument. Other combination of views including, but not limited to, body position, instrument views and the like are contemplated in various embodiments.

GUI 112 also includes a musical score display 116. Musical score 116 displays the musical notation associated with the song. Each different type of display is stored as a separate score track. Examples of notations used in score tracks include, but are not limited to, full piano, right hand, left hand, piano chords, guitar grids, tablature (TAB), TAB+notation, and guitar chords. Thus, depending on the notation used, the musical score associated with the song is displayed in sync with the song audio during playback. In other words, the timing of the particular notes/chords displayed in musical score display 116 corresponds to the timing of those notes/chords being played in the song audio.

Instrument animation 118 displays an animated graphical representation of the musical instrument being practiced/learned. For example, if the music instruction is for playing the piano, then an animated graphical representation of a piano keyboard is displayed. A guitar fret board is another example of an instrument animation that can be displayed. In various embodiments (using the example of the piano), the piano keyboard may be animated to show the keys that are to be played during the playback of the corresponding song audio. Instrument animation display 118 may also include a fingering overlay to illustrate the exact fingering that should be used for particular notes, chords, melodies, etc. In embodiments where the instrument animation is of a string instrument (such as a guitar or bass guitar), the animation may cause the strings to visually vibrate corresponding to the notes in the song audio as though the strings were actually plucked by a user.

Control panel 120 may include a variety of user-selectable options (e.g., play, record, tempo adjust, etc.) related to interacting with the music instruction system. Included in control panel 120 is a metronome 122. Metronome can be turned on and off by a user, who can also adjust the tempo in various embodiments. In addition to the user controls, metronome 122 may be switched on and off automatically during playback of a song in some embodiments.

Figure 2:
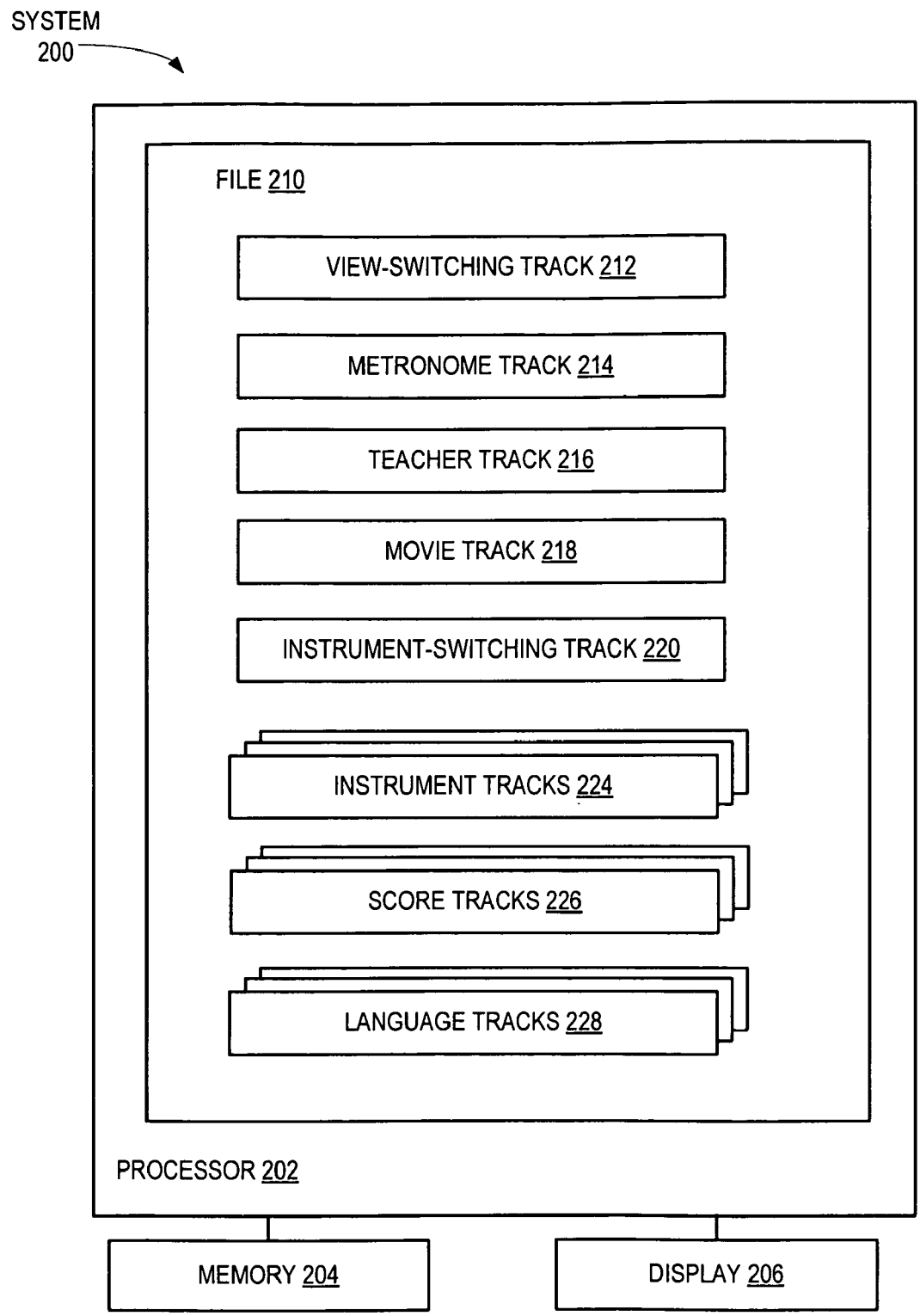
FIG. 2 is a block diagram illustrating a GUI display in a system according to various embodiments.

FIG. 2 is a block diagram illustrating a system according to various embodiments. System 200 is intended to include any system that executes files of the type described herein. In various embodiments, system 200 can be a computer, a device or musical device, an instrument, etc. capable of providing musical instruction. System 200 includes at least a processor 202, a memory 204, and a display 206. Processor 202 executes a project file 210, which may be retrieved from memory 204. Project file 210 includes a variety of tracks that facilitate musical instruction, in part, using a graphical user interface (GUI) in conjunction with display 206. In various embodiments, the tracks described herein are maintained as Musical Instrument Digital Interface (MIDI) tracks, unless otherwise noted. In other embodiments, other known formats can be used to maintain the different tracks. The various switching tracks may be dedicated tracks in various embodiments, meaning that each track is dedicated to controlling the switching of a particular file component.

The overall project views that the user can choose may be automated according to a view switching track 212. In other words, the project view(s) may change automatically during playback of a song. In various embodiments, the movie/video associated with the song is displayed in all project views. However, it is not necessary to display the movie/video in all project views. In one example, a project view might include both an animated instrument display and a musical score display. In another example, a project view might include only the animated instrument display or only the musical score display. Thus, a first project view might be displayed during one part of a song (e.g., a verse of the song) and a second project view might be displayed during another part of the song (e.g., the chorus of the song). The timing of the automatic switching between project views during playback of the song is controlled by view switching track 212.

View-switching track 212 also allows the musical score view to be switched automatically during playback of a song. Controller data on track 212 controls which score view among score tracks 226 will be displayed at which particular time during playback. As discussed previously, score views may include full score, right hand, left hand, simplified versions of full score, right hand, left hand, and various other combinations. Additionally, score views may include song lyrics in various embodiments.

A metronome associated with the music instruction system may be automated according to a metronome track 214. In general, the metronome is enabled and disabled by the user. However, in some embodiments, the metronome may be switched on or off automatically as controlled by the metronome track 214. A user may still be able to manually override the automated switching of the metronome in various embodiments.

Teacher track 216 provides the needed information for animating the instrument animation display. Teacher track 216 includes, for example, fingering numbers to indicate to the user which fingers to use in playing particular notes/chords. In certain embodiments MIDI channels 1-6 are used to indicate the different strings on a guitar (channel 1 being the lowest string and channel 6 being the highest string). MIDI notes are then used to indicate tab numbers and/or fret positions.

As discussed above, a movie track 218 may be displayed in all project views. Unlike the other tracks (which are maintained as MIDI tracks in various embodiments), movie track 218 is maintained in a separate video file (e.g., a Quicktime® file) that is linked to project file 210.

An instrument switching track 220 controls the automated switching of instrument tracks 224 within a project during playback of a song. As with other switching tracks, instrument switching track 220 defines the timing for automatic switching and defines which instruments to switch during playback.

Project file 110 also includes multiple language tracks 228 in various embodiments. A user may select a language in which to receive the musical instructions. Based on the selected language, one of the language tracks 228 will be played.

Figure 3:
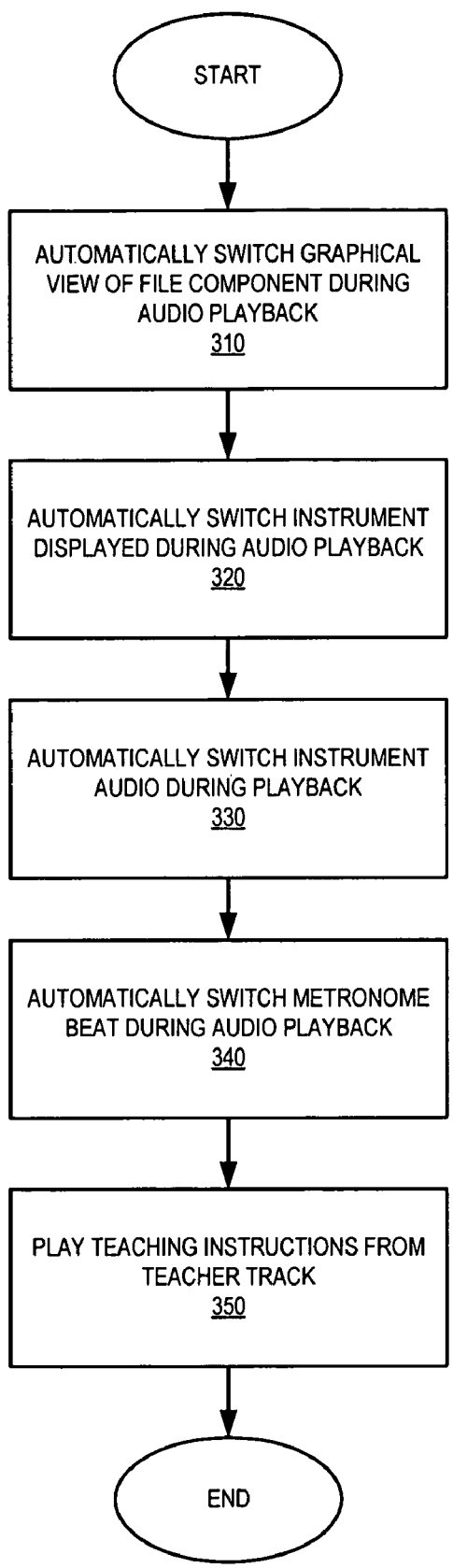
FIG. 3 is a flow diagram of operation in a system according to various embodiments.

FIG. 3 is a flow diagram of operation in a system according to various embodiments. A graphical view of one or more file components associated with an audio project file and displayed in a GUI is automatically switched 310 during playback of a song audio associated with an audio project. A file component may be an animated instrument display, a musical score display, a video/movie display, etc. The switching of views can include switching the views such that only a subset of the available file components is displayed. The switching may include rearranging a layout or resizing the file components that are displayed. The automatic switching is controlled by a view-switching track (e.g., a MIDI track) in various embodiments.

An animated graphical representation of an instrument displayed in the GUI is switched 320 during playback of a song audio. For example, one instrument (e.g., a piano) can be displayed during one portion a song playback while another instrument (e.g., a guitar) can be displayed during a different portion of the song playback. The switching between animated instrument displays is controlled by an instrument switching track (e.g., a MIDI track) in various embodiments.

In conjunction with the switching 320 of the animated graphical representation of the instrument, the instrument audio may also be switched automatically 330 in various embodiments. Thus, for example, in portions of a song playback where one instrument (e.g., a piano) is displayed, the audio being played is that of a piano. When the instrument display changes automatically (e.g., to a guitar), the audio may also be switched to that of a guitar.

A metronome beat is automatically switched 340 between on and off during playback of the song audio. For example, in certain portions of the song audio playback, it may be irrelevant or not useful to have a metronome beat and thus it can be automatically switched off. The metronome can be switched back on automatically for portions of the song audio where the metronome would be useful. The switching on and off of the metronome is controlled by a metronome switching track (e.g., a MIDI track) in various embodiments.

Teaching instructions are displayed 350 in the GUI during the song audio playback. Teaching instructions are maintained in a teacher track (e.g., a MIDI track) and may include fingering overlays to indicate on an animated instrument display which notes/chords to play at a particular time. The teaching instructions are synchronized to the song audio in various embodiments.

Additional items may be displayed in the GUI in various embodiments, including but not limited to, artist information, artist graphics, etc.

Figure 4:
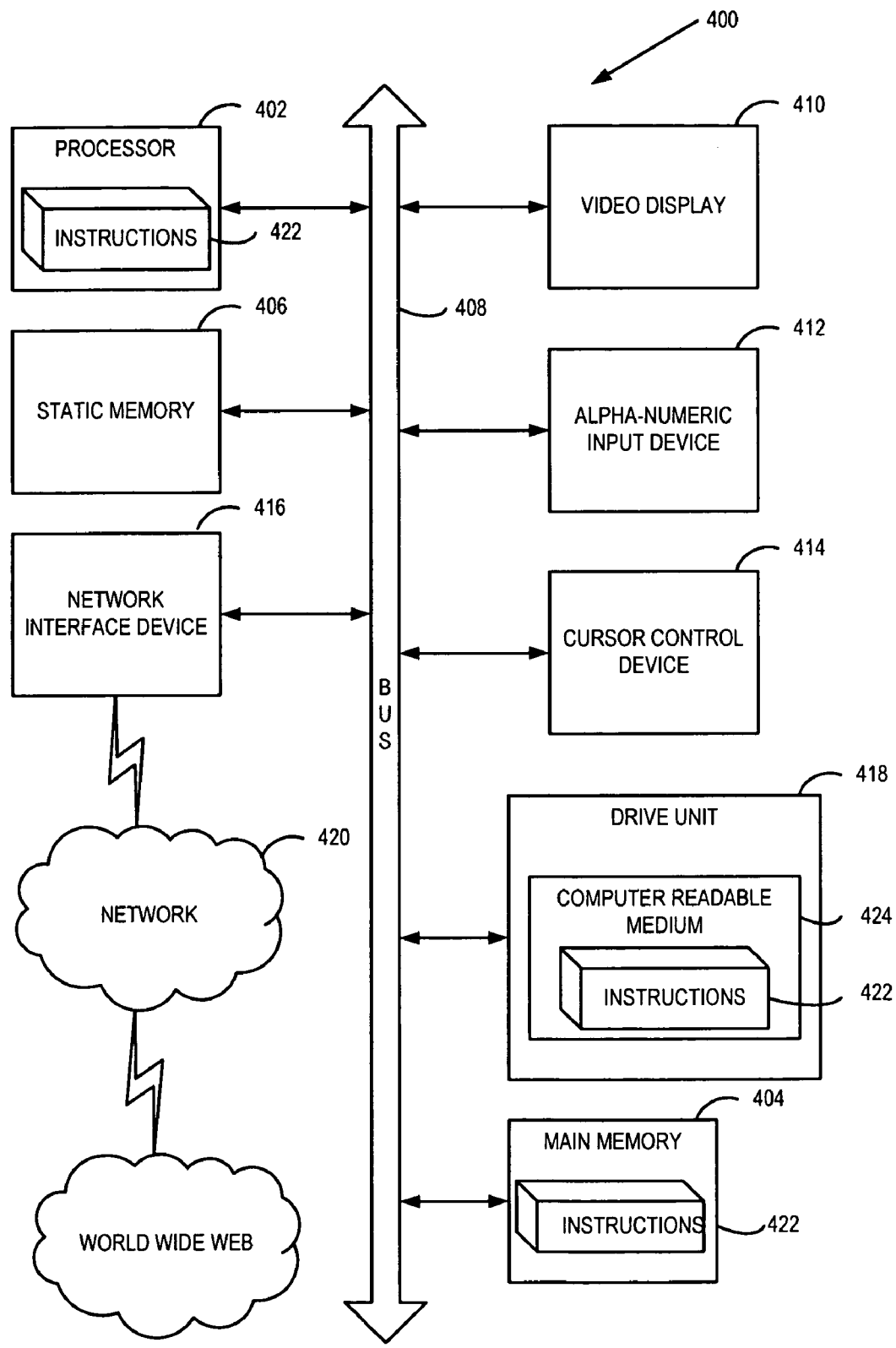
FIG. 4 is block diagram illustrating a suitable computing environment for practicing various embodiments.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 422 for performing the operations and steps discussed herein.

The computer system 400 may further include a network interface device 416. The computer system 400 also may include a video display unit 410 (e.g., a liquid crystal display (LCD) or a cathode ray tube (CRT)), an alphanumeric input device 412 (e.g., a keyboard), and a cursor control device 414 (e.g., a mouse)

The secondary memory 418 may include a machine-readable storage medium (or more specifically a computer-readable storage medium) 424 on which is stored one or more sets of instructions (e.g., software 424) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network via the network interface device 416.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer readable storage medium" shall accordingly be taken to include, but not be limited to, solid-state memories, and optical and magnetic media.

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A computer-implemented method, comprising:
automatically switching a graphical view of one or more file components associated with a file for a first audio and displayed in a graphical user interface (GUI) during a playback of the first audio, the switching based at least in part on a Musical Instrument Digital Interface (MIDI) view-switching track, the file being configured for playback with the first audio and having a plurality of tracks and the one or more file components, the MIDI view-switching track being one of the plurality of tracks;
automatically switching an instrument displayed in the GUI during the playback of the first audio based at least in part on a MIDI instrument-switching track belonging to the file which is configured for playback with the first audio; and
automatically switching a metronome beat associated with the first audio between on and off during the playback of the first audio based at least in part on a MIDI metronome-switching track belonging to the file.

2. The method of claim 1, wherein the file component is one or more of a video, a musical score or a musical instrument and wherein each graphical view of the file component is stored as a separate MIDI track.

3. The method of claim 1, further comprising:
playing voice-recorded teaching instructions associated with the first audio based on a teacher track belonging to the file.

4. The method of claim 3, further comprising:
playing the voice-recorded teaching instructions associated with the first audio in an alternate language based on an alternate language teacher track.

5. The method of claim 1, further comprising:
displaying one or more artist graphics associated with the first audio.

6. A computer-implemented method, comprising:
accessing a communication interface; and
providing a data signal on the communication interface associated with a file configured for playback with a first audio, the file having one or more file components and a plurality of tracks, the plurality of tracks including:
- a Musical Instrument Digital Interface (MIDI) view-switching track to automatically control switching of a graphical view of the one or more file components associated with the first audio and displayed in a graphical user interface (GUI) during a playback of the first audio;
- a MIDI instrument-switching track to automatically control switching of an instrument displayed in the GUI during the playback of the first audio; and
- a MIDI metronome-switching track to automatically control switching of a metronome beat associated with the first audio between on and off during the playback of the first audio.

7. The method of claim 6, wherein the file component is one or more of a video, a musical score or a musical instrument and wherein each graphical view of the file component is stored as a separate MIDI track.

8. The method of claim 6, wherein the providing of the data signal on the communication interface further comprises providing the data signal on the communication interface having further data describing:
- a teacher track having voice-recorded teaching instructions associated with the first audio; and
- a language track having the voice-recorded teaching instructions in an alternate language.

9. The method of claim 6, wherein the providing of the data signal on the communication interface further comprises providing the data signal on the communication interface having further data describing:
- one or more artist graphics associated with the first audio.

10. A computer-readable storage medium containing instruction that, when executed, cause a computer to:
- automatically switch a graphical view of one or more file components associated with a file for a first audio and displayed in a graphical user interface (GUI) during a playback of the first audio, the switching based at least in part on a Musical Instrument Digital Interface (MIDI) view-switching track, the file being configured for playback with the first audio and having a plurality of tracks and the one or more file components the MIDI view-switching track being one of the plurality of tracks;
- automatically switch an instrument displayed in the GUI during the playback of the first audio based at least in part on a MIDI instrument-switching track belonging to the file which is configured for playback with the first audio; and
- automatically switch a metronome beat associated with the first audio between on and off during the playback of the first audio based at least in part on a MIDI metronome-switching track belonging to the file.

11. The computer-readable storage medium of claim 10, wherein the file component is one or more of a video, a musical score or a musical instrument and wherein each graphical view of the file component is stored as a separate MIDI track.

12. The computer-readable storage medium of claim 10, wherein the instructions further comprise instructions that cause the computer to:
- play voice-recorded teaching instructions associated with the first audio based at least in part on a teacher track belonging to the file.

13. The computer-readable storage medium of claim 12, wherein the instructions to cause the computer to play voice-recorded teaching instructions comprise further instructions to:
- play the voice-recorded teaching instructions associated with the first audio in an alternate language based on an alternate language teacher track.

14. The computer-readable medium of claim 10, wherein the instructions comprise further instructions to cause the computer to:
- display one or more artist graphics associated with the first audio.

15. A system, comprising:
- an audio player to execute a file having a plurality of track modules and one or more file components, wherein the file is configured for playback with a first audio;
- the plurality of track modules including a Musical Instrument Digital Interface (MIDI) view-switching track module to automatically control switching of a graphical view of the one or more file components associated with the first audio and displayed in a graphical user interface (GUI) during a playback of the first audio;
- a MIDI instrument-switching track module to automatically control switching of an instrument displayed in the GUI during the playback of the first audio;
- a MIDI metronome-switching track module to automatically control switching of a metronome beat associated with the audio between on and off during the playback of the first audio; and
- a memory to store the modules.

16. The system of claim 15, wherein the file component is one or more of a video, a musical score or a musical instrument and wherein each graphical view of the file component is stored as a separate MIDI track.

17. The system of claim 16, further comprising:
- a teacher track module having voice-recorded teaching instructions associated with the first audio; and
- a language track module having the voice-recorded teaching instructions in an alternate language.

* * * * *